US012472688B2

(12) United States Patent
Toda et al.

(10) Patent No.: US 12,472,688 B2
(45) Date of Patent: Nov. 18, 2025

(54) THREE-DIMENSIONAL MOLDING DEVICE

(71) Applicant: SEIKO EPSON CORPORATION, Tokyo (JP)

(72) Inventors: Riona Toda, Shiojiri (JP); Kenta Anegawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 212 days.

(21) Appl. No.: 18/305,521

(22) Filed: Apr. 24, 2023

(65) Prior Publication Data

US 2023/0339179 A1  Oct. 26, 2023

(30) Foreign Application Priority Data

Apr. 25, 2022  (JP) .................. 2022-071716

(51) Int. Cl.
*B29C 64/209* (2017.01)
*B29C 64/118* (2017.01)
*B29C 64/194* (2017.01)
*B33Y 30/00* (2015.01)

(52) U.S. Cl.
CPC .......... *B29C 64/209* (2017.08); *B29C 64/118* (2017.08); *B29C 64/194* (2017.08); *B33Y 30/00* (2014.12)

(58) Field of Classification Search
None
See application file for complete search history.

(56) References Cited

U.S. PATENT DOCUMENTS

| | | | | |
|---|---|---|---|---|
| 11,020,901 | B2 * | 6/2021 | Yuwaki | B22F 12/57 |
| 11,724,453 | B2 * | 8/2023 | Susnjara | B29C 64/209 |
| | | | | 700/118 |
| 11,833,717 | B2 * | 12/2023 | Anegawa | B33Y 30/00 |
| 2019/0160746 | A1 * | 5/2019 | Anegawa | B33Y 70/10 |
| 2019/0366629 | A1 * | 12/2019 | Albor | B29C 64/336 |
| 2020/0016833 | A1 * | 1/2020 | Yuwaki | B33Y 70/10 |
| 2021/0031423 | A1 * | 2/2021 | Yamashita | B29C 45/20 |
| 2021/0402687 | A1 | 12/2021 | Anegawa et al. | |
| 2025/0001681 | A1 * | 1/2025 | Malhotra | B29C 48/02 |

FOREIGN PATENT DOCUMENTS

JP  2022-007276 A  1/2022

* cited by examiner

*Primary Examiner* — Yung-Sheng M Tsui

(74) *Attorney, Agent, or Firm* — WORKMAN NYDEGGER

(57) ABSTRACT

A three-dimensional molding device includes: a stage; an ejection unit including a tip end portion in which a first nozzle hole and a second nozzle hole are formed adjacent to each other at a predetermined interval along a first axis, and configured to eject a material from the first nozzle hole and the second nozzle hole toward the stage; a position changing unit configured to change relative positions of the stage and the ejection unit along a second axis that is parallel to a deposition surface and that is orthogonal to the first axis; and a pressing unit disposed on a rear side in a movement direction of the ejection unit relative to the stage and configured to press the material deposited on the stage. The pressing unit presses a first deposition portion formed by the material that is ejected from the first nozzle hole and deposited, and a second deposition portion formed by the material that is ejected from the second nozzle hole and deposited at an interval from the first deposition portion, so as to couple the first deposition portion and the second deposition portion.

8 Claims, 13 Drawing Sheets

FIG. 13

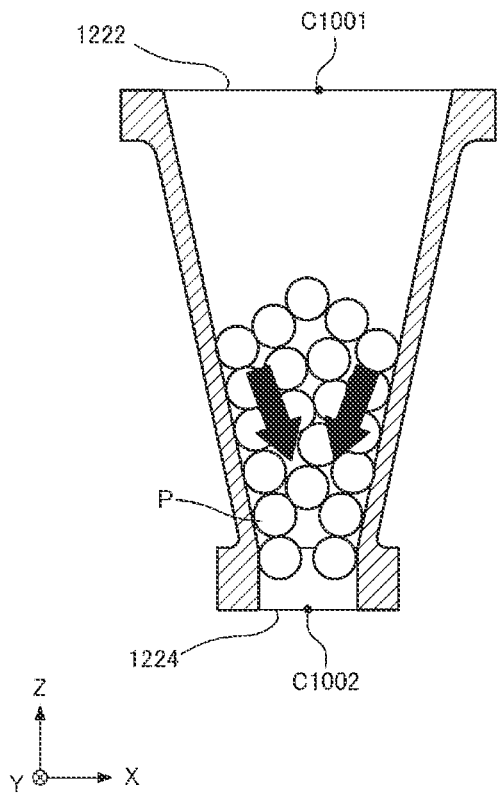

FIG. 14

| | INNER DIAMETER [mm] | OUTER DIAMETER [mm] | LENGTH [mm] | FIRST OPENING DIAMETER [mm] | SECOND OPENING DIAMETER [mm] | θ [°] |
|---|---|---|---|---|---|---|
| MAIN BODY PORTION | 54 | 60 | 850 | – | – | – |
| COUPLING PIPE | 20 | 22 | 200 | – | – | – |
| INPUT PORTION (CONCENTRIC) | – | – | – | 54.9 | 23 | 70 |
| INPUT PORTION (ECCENTRIC 1) | – | – | – | 54.9 | 23 | 55 |
| INPUT PORTION (ECCENTRIC 2) | – | – | – | 54 | 19 | 65 |

FIG. 15

| MATERIAL | GRADE | FILLER | SPECIFIC GRAVITY | CROSS-SECTIONAL SHAPE | SIZE [mm] | | BRIDGE EVALUATION RESULT | | |
|---|---|---|---|---|---|---|---|---|---|
| | | | | | LONG SIDE × SHORT SIDE | THICKNESS | CONCENTRIC | ECCENTRIC 1 | ECCENTRIC 2 |
| PPS | FZ-2130 | GF | 1.59 | ELLIPTICAL | 2 × 3 | 2 | A | A | A |
| ABS | GR-2020G | GF | 1.05 | CIRCULAR | Φ3 | 3 | B | A | A |
| POM | LW-02 | – | 1.4 | CIRCULAR | Φ2 | 3 | A | A | A |
| ASACLEAN | ASACLEAN U | – | 1.25 | CIRCULAR | Φ4 | 5 | B | B | A |

THREE-DIMENSIONAL MOLDING DEVICE

The present application is based on, and claims priority from JP Application Serial Number 2022-071716, filed Apr. 25, 2022, the disclosure of which is hereby incorporated by reference herein in its entirety.

BACKGROUND

1. Technical Field

The present disclosure relates to a three-dimensional molding device.

2. Related Art

There is known a three-dimensional molding device that molds a three-dimensional molded object by ejecting a plasticized material toward a stage and curing the plasticized material.

For example, JP-A-2022-7276 discloses a three-dimensional molding device including an ejection unit in which a plurality of nozzles are arranged in a staggered manner when viewed in a +Z direction. In JP-A-2022-7276, the ejection unit is moved relative to the stage in a +X direction, and materials ejected from the nozzles adjacent to each other in a Y direction come into contact with each other.

In the three-dimensional molding device disclosed in JP-A-2022-7276, since the plurality of nozzles are arranged in the staggered manner, one nozzle among the nozzles adjacent to each other in the Y direction is located in the +X direction with respect to the other adjacent nozzle. Therefore, a material ejected from the other nozzle comes into contact with a material ejected from the one nozzle immediately after being ejected. However, the material ejected from the one nozzle comes into contact with the material ejected from the other nozzle after a predetermined time has elapsed since the ejection.

In the materials ejected from the adjacent nozzles, when a time difference from the ejection to the contact with the deposited material is large, contact portions are different in state, and a gap may occur therebetween.

SUMMARY

A three-dimensional molding device according to one aspect of the present disclosure includes: a stage having a deposition surface on which a material is to be deposited; an ejection unit including a tip end portion in which a first nozzle hole and a second nozzle hole are formed adjacent to each other at a predetermined interval along a first axis parallel to the deposition surface, and configured to eject the material from the first nozzle hole and the second nozzle hole toward the stage; a position changing unit configured to change relative positions of the stage and the ejection unit along a second axis that is parallel to the deposition surface and that is orthogonal to the first axis; and a pressing unit disposed on a rear side in a movement direction of the ejection unit relative to the stage and configured to press the material deposited on the stage, in which the pressing unit presses a first deposition portion formed by the material that is ejected from the first nozzle hole and deposited, and a second deposition portion formed by the material that is ejected from the second nozzle hole and deposited at an interval from the first deposition portion, so as to couple the first deposition portion and the second deposition portion.

BRIEF DESCRIPTION OF THE DRAWINGS

FIG. 13 is a view showing a flow of a material of the three-dimensional molding device according to the reference example.

FIG. 14 is a table showing sizes and shapes of a main body portion, an input portion, and a coupling pipe used in each of experimental examples.

FIG. 15 is a table showing used materials and bridge evaluation results in the experimental examples.

DESCRIPTION OF EXEMPLARY EMBODIMENTS

Hereinafter, a preferred embodiment of the present disclosure will be described in detail with reference to the drawings. The embodiment to be described below does not unduly limit contents of the present disclosure described in the claims. Not all configurations to be described below are necessarily essential components of the present disclosure.

1. Three-Dimensional Molding Device
1.1. Overall Configuration

Figure 1:
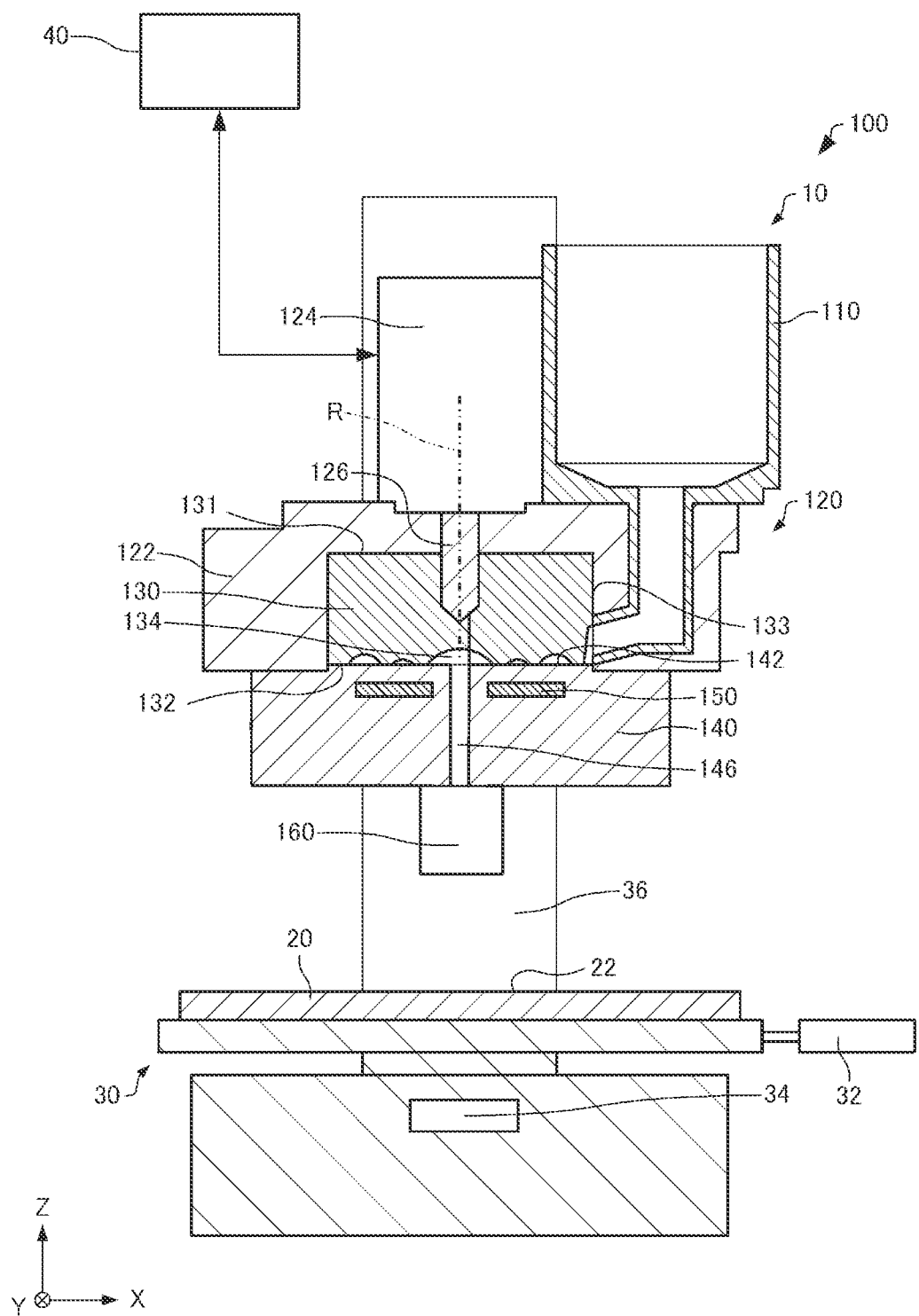
FIG. 1 is a cross-sectional view schematically showing a three-dimensional molding device according to an embodiment.

First, a three-dimensional molding device according to the embodiment will be described with reference to the drawings. FIG. 1 is a cross-sectional view schematically showing a three-dimensional molding device 100 according to the embodiment. FIG. 1 shows an X axis, a Y axis, and a Z axis as three axes orthogonal to one another. An X-axis direction and a Y-axis direction are, for example, horizontal directions. A Z-axis direction is, for example, a vertical direction.

As shown in FIG. 1, the three-dimensional molding device 100 includes, for example, an ejection unit 10, a stage 20, a position changing unit 30, and a control unit 40.

The three-dimensional molding device 100 drives the position changing unit 30 to change relative positions of the ejection unit 10 and the stage 20 while ejecting a plasticized molding material from the ejection unit 10 toward the stage 20. Accordingly, the three-dimensional molding device 100 molds a three-dimensional molded object having a desired shape on the stage 20.

Although not shown, a plurality of ejection units 10 may be provided. For example, two ejection units 10 may be provided. In this case, both of the two ejection units 10 may eject the molding material forming the three-dimensional molded object, or one may eject the molding material and the other may eject a support material supporting the three-dimensional molded object.

As shown in FIG. 1, the ejection unit 10 includes, for example, a storage unit 110, a plasticization unit 120, and a tip end portion 160. FIG. 1 shows the tip end portion 160 in a simplified manner for convenience.

The storage unit 110 stores a material serving as a raw material. The storage unit 110 supplies the stored material to the plasticization unit 120. The material supplied by the storage unit 110 has, for example, a pellet shape or a powder shape. The storage unit 110 includes, for example, a hopper. The material supplied by the storage unit 110 is, for example, acrylonitrile butadiene styrene (ABS) resin.

The plasticization unit 120 includes, for example, a screw case 122, a drive motor 124, a flat screw 130, a barrel 140, and a heater 150. The plasticization unit 120 plasticizes at least a part of the material in a solid state supplied from the storage unit 110, generates a paste-state molding material having fluidity, and supplies the molding material to the tip end portion 160.

Plasticization is a concept including melting, and means changing from a solid state to a flowable state. Specifically, for a material in which glass transition occurs, plasticization refers to setting a temperature of the material to be equal to or higher than a glass transition point. For a material in which glass transition does not occur, plasticization refers to setting a temperature of the material to a temperature equal to or higher than a melting point.

The screw case 122 is a housing that accommodates the flat screw 130. The barrel 140 is provided on a lower surface of the screw case 122. The flat screw 130 is accommodated in a space surrounded by the screw case 122 and the barrel 140.

The drive motor 124 is provided on an upper surface of the screw case 122. The drive motor 124 is, for example, a servomotor. A shaft 126 of the drive motor 124 is coupled to an upper surface 131 of the flat screw 130. The drive motor 124 is controlled by the control unit 40. Although not shown, the shaft 126 of the drive motor 124 and the upper surface 131 of the flat screw 130 may be coupled to each other via a speed reducer.

The flat screw 130 has a substantially cylindrical shape in which a size in a direction of a rotation axis R is smaller than a size in a direction orthogonal to the direction of the rotation axis R. In the shown example, the rotation axis R is parallel to the Z axis. The flat screw 130 is rotated about the rotation axis R by a torque generated by the drive motor 124.

Figure 2:
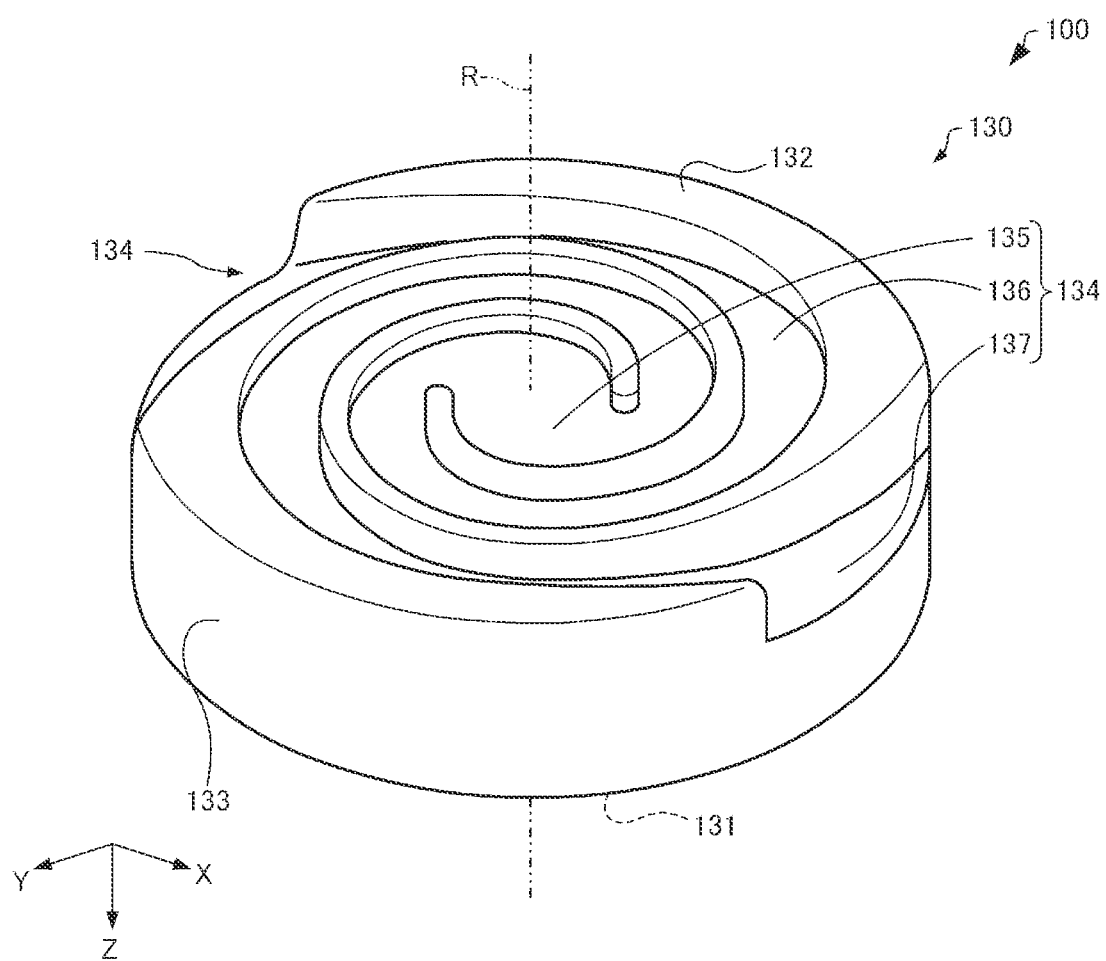
FIG. 2 is a perspective view schematically showing a flat screw of the three-dimensional molding device according to the embodiment.

The flat screw 130 has the upper surface 131, an opposite-side groove forming surface 132 from the upper surface 131, and a side surface 133 coupling the upper surface 131 and the groove forming surface 132. First grooves 134 are formed in the groove forming surface 132. The side surface 133 is, for example, perpendicular to the groove forming surface 132. Here, FIG. 2 is a perspective view schematically showing the flat screw 130. For convenience, FIG. 2 shows a state in which an up-down positional relationship is reversed from a state shown in FIG. 1.

As shown in FIG. 2, the first grooves 134 are formed in the groove forming surface 132 of the flat screw 130. The first groove 134 includes, for example, a central portion 135, a coupling portion 136, and a material introduction portion 137. The central portion 135 faces a communication hole 146 formed in the barrel 140. The central portion 135 communicates with the communication hole 146. The coupling portion 136 couples the central portion 135 and the material introduction portion 137. In the shown example, the coupling portion 136 is formed in a spiral shape from the central portion 135 toward an outer periphery of the groove forming surface 132. The material introduction portion 137 is formed on the outer periphery of the groove forming surface 132. That is, the material introduction portion 137 is formed in the side surface 133 of the flat screw 130. The material supplied from the storage unit 110 is introduced from the material introduction portion 137 into the first groove 134, passes through the coupling portion 136 and the central portion 135, and is conveyed to the communication hole 146 formed in the barrel 140. For example, two first grooves 134 are formed.

The number of first grooves 134 is not particularly limited. Although not shown, three or more first grooves 134 may be formed, or only one first groove 134 may be formed.

As shown in FIG. 1, the barrel 140 is provided below the flat screw 130. In the shown example, "below" refers to a −Z-axis direction. The barrel 140 includes a facing surface 142 facing the groove forming surface 132 of the flat screw 130. The communication hole 146 communicating with the first groove 134 is formed at a center of the facing surface 142. Here, FIG. 3 is a plan view schematically showing the barrel 140.

Figure 3:
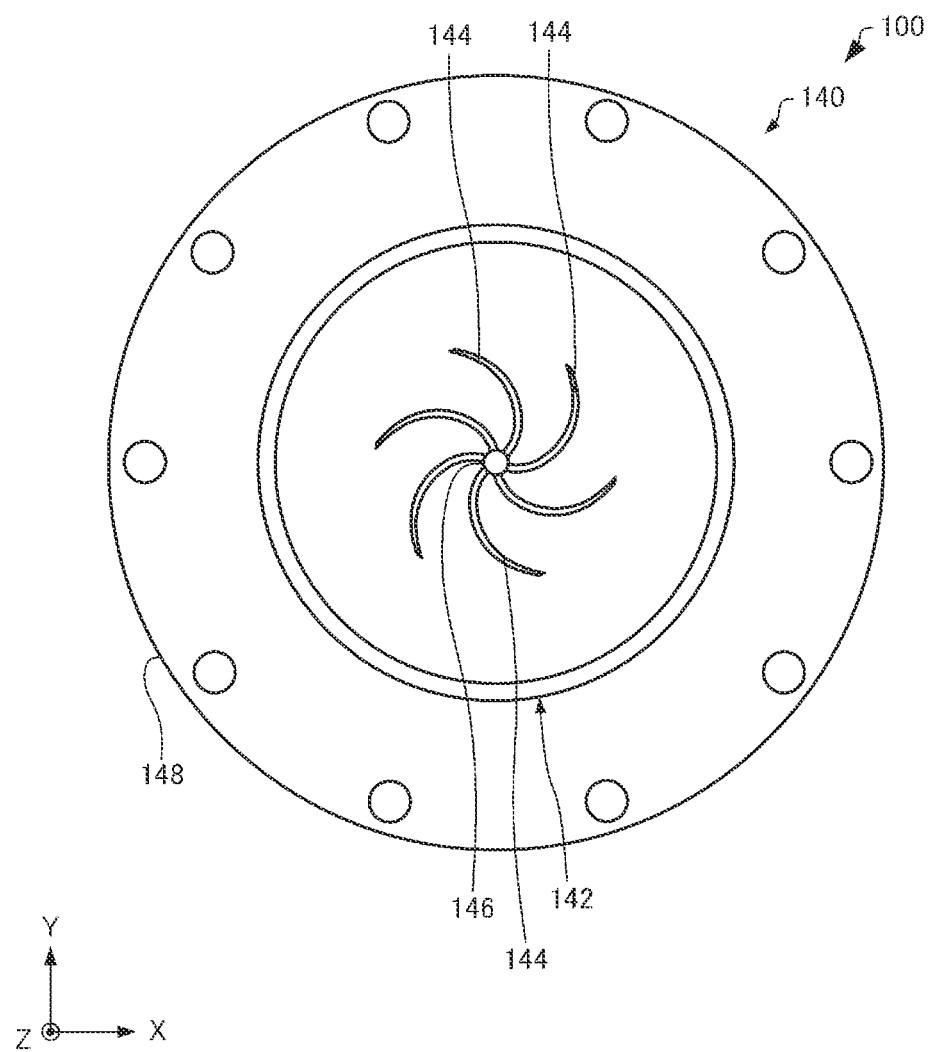
FIG. 3 is a view schematically showing a barrel of the three-dimensional molding device according to the embodiment.

As shown in FIG. 3, second grooves 144 and the communication hole 146 are formed in the facing surface 142 of the barrel 140. A plurality of second grooves 144 are formed. In the shown example, six second grooves 144 are formed, but the number of second grooves 144 is not particularly limited. The plurality of second grooves 144 are formed around the communication hole 146 when viewed in the Z-axis direction. One end of the second groove 144 is coupled to the communication hole 146, and the second groove 144 extends spirally from the communication hole 146 toward an outer periphery 148 of the barrel 140. The second groove 144 has a function of guiding the plasticized molding material to the communication hole 146.

A shape of second groove 144 is not particularly limited, and may be, for example, linear. One end of the second groove 144 may not be coupled to the communication hole 146. The second groove 144 may not be formed in the facing surface 142. The second groove 144 is preferably formed in the facing surface 142 in consideration of efficiently guiding the plasticized molding material to the communication hole 146.

As shown in FIG. 1, the heater 150 is provided in the barrel 140. The heater 150 heats the material supplied between the flat screw 130 and the barrel 140. The heater 150 is controlled by the control unit 40. The plasticization unit 120 generates a plasticized molding material by heating the material by the heater 150 while conveying the material toward the communication hole 146 by the flat screw 130 and the barrel 140, and causes the generated molding material to flow out from the communication hole 146. The heater 150 may have a ring shape when viewed from the Z-axis direction. The heater 150 may not be provided in the barrel 140, and may be provided in, for example, the flat screw 130. Although not shown, the three-dimensional molding device 100 may plasticize the material using an in-line screw elongated in a rotation axis direction instead of the plasticization unit 120.

The tip end portion 160 is provided below the barrel 140. The plasticized molding material is supplied to the tip end portion 160 from the communication hole 146. The ejection unit 10 ejects the material toward the stage 20 from a position where the tip end portion 160 and the material deposited on the stage 20 are not in contact with each other. A distance between the tip end portion 160 and the material deposited on the stage 20 is, for example, 0.2 mm or more and 1.0 mm or less, and preferably 0.4 mm or more and 0.6 mm or less. Details of the tip end portion 160 will be described later.

The stage 20 is provided below the tip end portion 160. In the shown example, the stage 20 has a rectangular parallelepiped shape. The stage 20 supports the molding material ejected from the ejection unit 10. The stage 20 has a deposition surface 22 on which the molding material is deposited. The deposition surface 22 is a region on an upper surface of the stage 20. The deposition surface 22 is parallel to the X axis and the Y axis.

A material of the stage 20 is, for example, a metal such as aluminum. The stage 20 may include a metal plate and an adhesive sheet provided on the metal plate. In this case, the deposition surface 22 is formed of the adhesive sheet. The adhesive sheet can improve adhesion between the stage 20 and the molding material ejected from the ejection unit 10.

Although not shown, the stage 20 may include a metal plate in which a groove is formed, and a base layer formed to embed the groove. In this case, the deposition surface 22 is formed of the base layer. A material of the base layer is, for example, the same as the molding material. The base layer can improve adhesion between the stage 20 and the molding material ejected from the ejection unit 10.

The position changing unit 30 supports the stage 20. The position changing unit 30 changes the relative positions of the ejection unit 10 and the stage 20 along a second axis parallel to the deposition surface 22 and orthogonal to a first axis. In the shown example, the first axis is the Y axis. The second axis is the X axis.

The position changing unit 30 changes the relative positions of the ejection unit 10 and the stage 20 in the X-axis direction and the Y-axis direction, for example, by moving the stage 20 in the X-axis direction and the Y-axis direction. The position changing unit 30 changes the relative positions of the ejection unit 10 and the stage 20 in the Z-axis direction by moving the ejection unit 10 in the Z-axis direction.

The position changing unit 30 includes, for example, a first electric actuator 32, a second electric actuator 34, and a third electric actuator 36. The first electric actuator 32 moves the stage 20 in the X-axis direction. The second electric actuator 34 moves the stage 20 in the Y-axis direction. The third electric actuator 36 moves the ejection unit 10 in the Z-axis direction. The third electric actuator 36 supports the ejection unit 10.

A configuration of the position changing unit 30 is not particularly limited as long as the position changing unit 30 can change the relative positions of the ejection unit 10 and the stage 20. For example, the position changing unit 30 may move the stage 20 in the Z-axis direction and move the ejection unit 10 in the X-axis direction and the Y-axis direction, or may move the stage 20 or the ejection unit 10 in the X-axis direction, the Y-axis direction, and the Z-axis direction. The position changing unit 30 may not include the second electric actuator 34 that moves the stage 20 in the Y-axis direction.

The control unit 40 is implemented by, for example, a computer including a processor, a main storage device, and an input and output interface that receives signals from the outside and outputs the signals to the outside. The control unit 40 exerts various functions, for example, by the processor executing a program read into the main storage device. Specifically, the control unit 40 controls the ejection unit 10 and the position changing unit 30. The control unit 40 may not be implemented by a computer but by a combination of a plurality of circuits.

1.2. Tip End Portion

Figure 4:
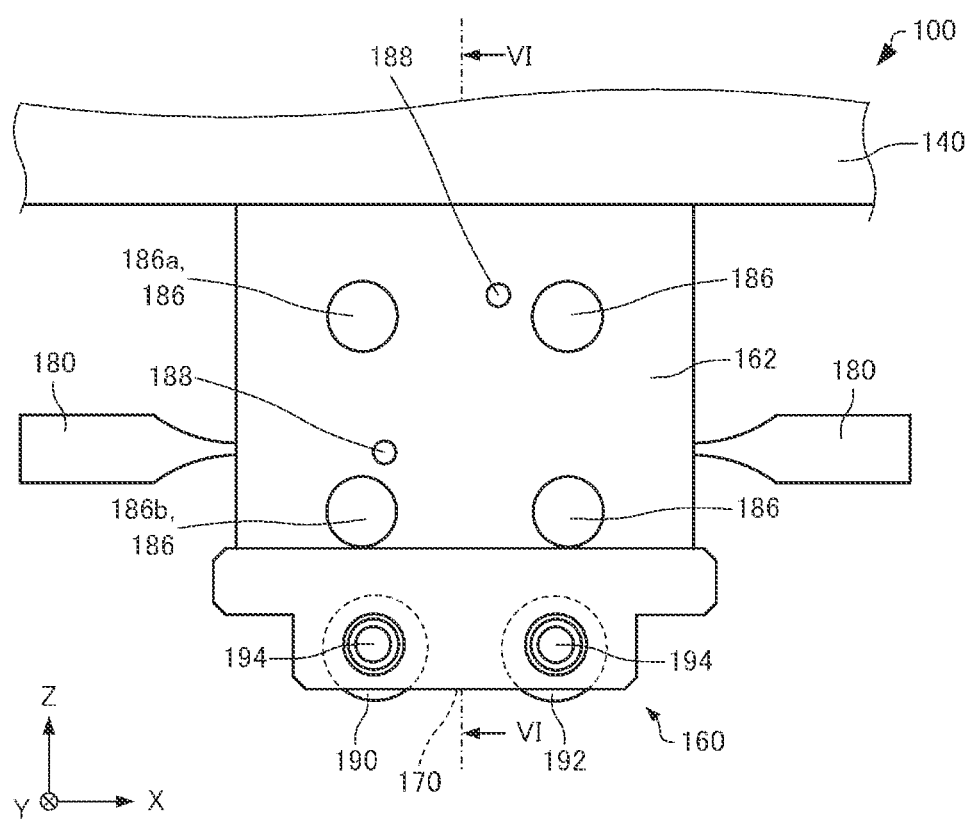
FIG. 4 is a side view schematically showing a tip end portion of the three-dimensional molding device according to the embodiment.
Figure 5:
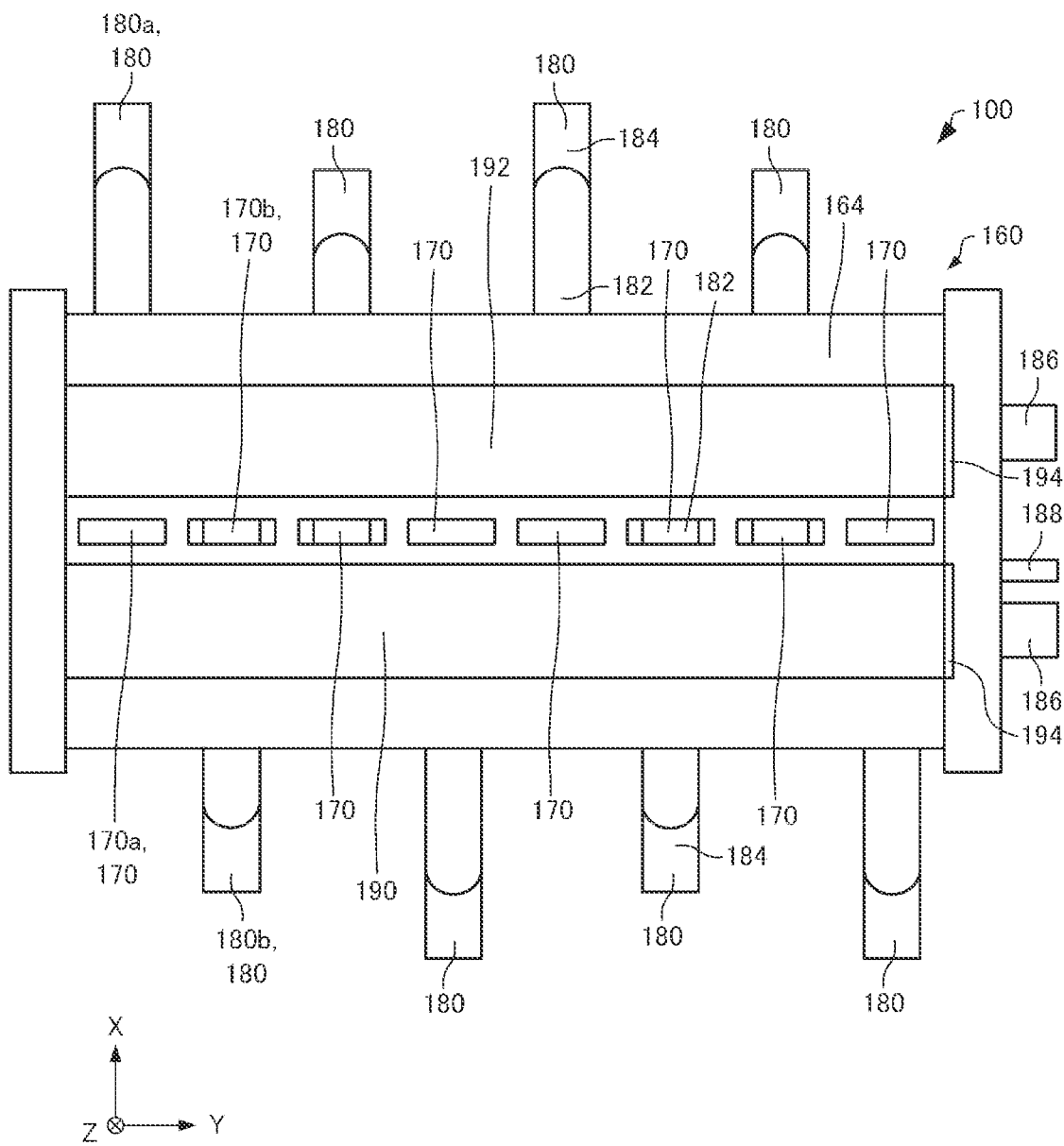
FIG. 5 is a bottom view schematically showing the tip end portion of the three-dimensional molding device according to the embodiment.
Figure 6:
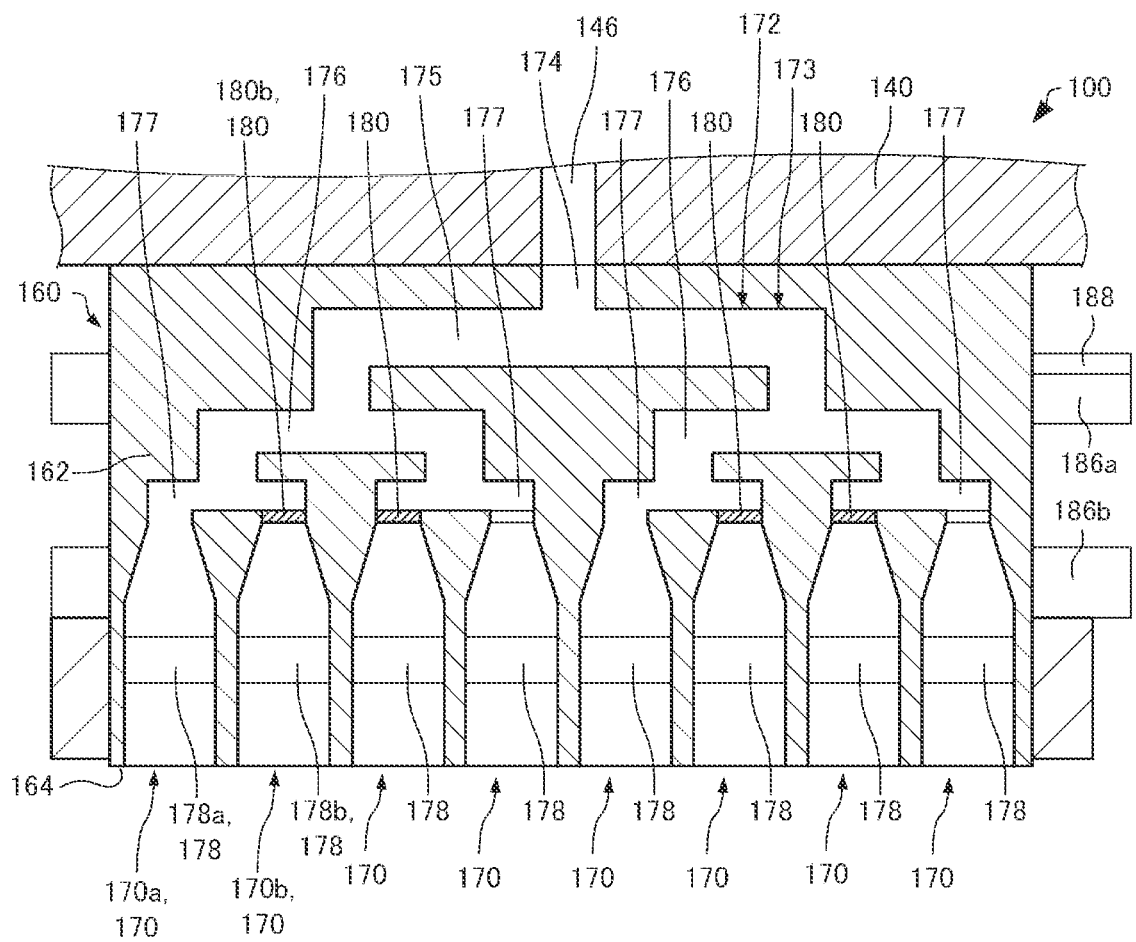
FIG. 6 is a cross-sectional view schematically showing the tip end portion of the three-dimensional molding device according to the embodiment.
Figure 7:
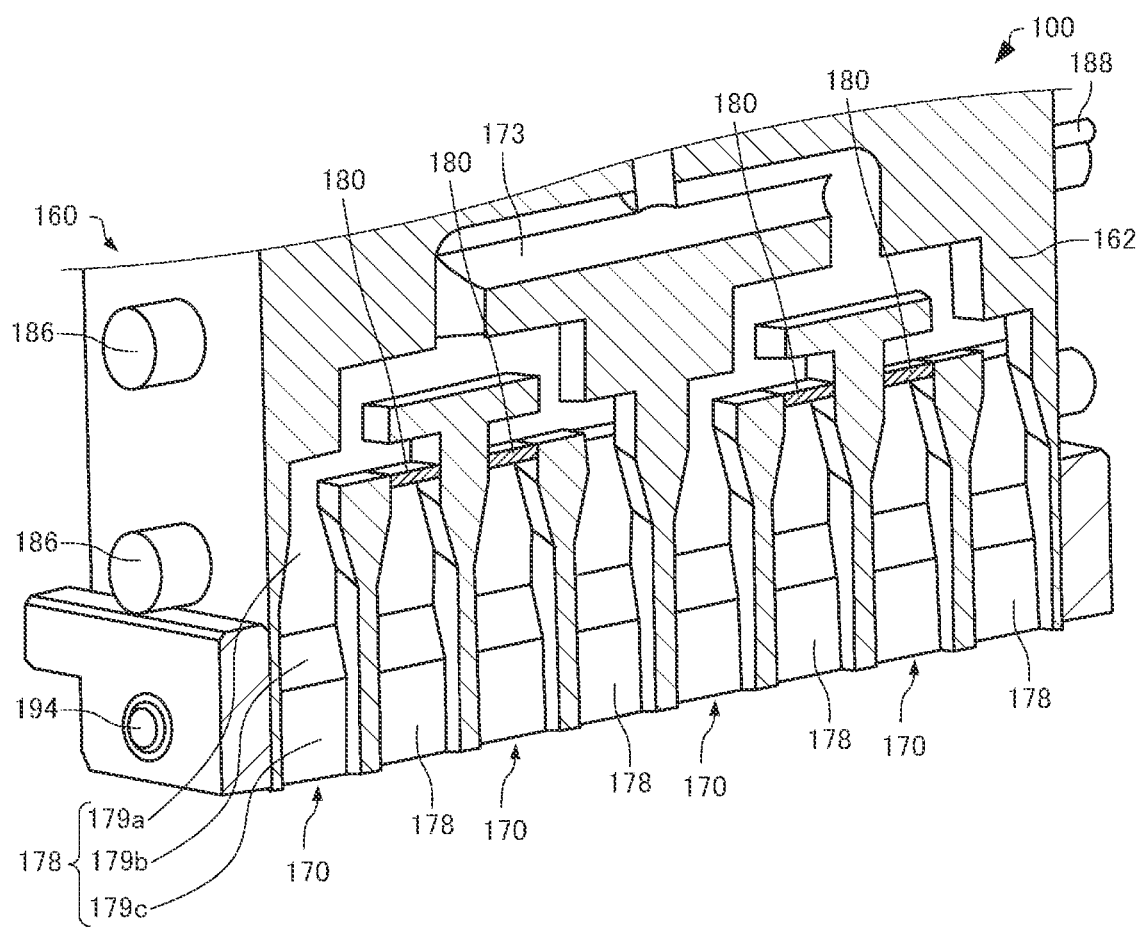
FIG. 7 is a cross-sectional perspective view schematically showing the tip end portion of the three-dimensional molding device according to the embodiment.

FIG. 4 is a side view schematically showing the tip end portion 160. FIG. 5 is a bottom view schematically showing the tip end portion 160. FIG. 6 is a cross-sectional view schematically showing the tip end portion 160 taken along a line VI-VI in FIG. 4. FIG. 7 is a cross-sectional perspective view schematically showing the tip end portion 160.

As shown in FIGS. 4 to 7, the tip end portion 160 includes, for example, a base portion 162, ejection adjustment units 180, heating units 186, and temperature sensors 188.

As shown in FIG. 4, the base portion 162 is coupled to the barrel 140. The base portion 162 has, for example, a substantially rectangular parallelepiped shape. A material of the base portion 162 is, for example, steel use stainless (SUS). As shown in FIGS. 5 to 7, nozzle holes 170 and a flow path 172 are formed in the base portion 162.

As shown in FIG. 5, the nozzle holes 170 are formed in a bottom surface 164 of the base portion 162. In the shown example, the bottom surface 164 is an end surface of the base portion 162 in the −Z-axis direction. The nozzle hole 170 has a rectangle shape when viewed from the Z-axis direction. The ejection unit 10 ejects the molding material from the nozzle holes 170 toward the stage 20. A shape of the nozzle hole 170 is not particularly limited, and may be, for example, circular.

A plurality of nozzle holes 170 are formed. In the shown example, sizes of the plurality of nozzle holes 170 are the same as one another. The plurality of nozzle holes 170 are linearly arranged at a predetermined pitch along the Y axis. In the shown example, eight nozzle holes 170 are formed, but the number of nozzle holes 170 is not particularly limited. A first nozzle hole 170a and a second nozzle hole 170b among the plurality of nozzle holes 170 are formed adjacent to each other. In the shown example, the first nozzle hole 170a is located closest to a −Y-axis direction among the eight nozzle holes 170. The first nozzle hole 170a and the second nozzle hole 170b are formed at a predetermined interval along the Y axis. Sizes of the plurality of nozzle holes 170 may be different from one another.

As shown in FIG. 6, the flow path 172 couples the nozzle holes 170 and the communication hole 146 formed in the barrel 140. The flow path 172 includes a common flow path 173 and individual flow paths 178.

The common flow path 173 includes, for example, a flow portion 174 that communicates with the communication hole 146, a first branch portion 175 that branches into two branches from the flow portion 174, second branch portions 176, each of which branches into two branches from each tip end of the first branch portion 175, and third branch portions 177, each of which branches into two branches from each tip end of the second branch portion 176.

The individual flow path 178 couples the common flow path 173 and the nozzle hole 170. In the shown example, the individual flow path 178 couples the third branch portion 177 and the nozzle hole 170. The molding material passes through the communication hole 146, the flow portion 174, the first branch portion 175, the second branch portion 176, the third branch portion 177, and the individual flow path 178 in this order, and is ejected from the nozzle hole 170.

A plurality of individual flow paths 178 are formed corresponding to the nozzle holes 170. Among the plurality of individual flow paths 178, a first individual flow path 178a communicates with the first nozzle hole 170a. Among the plurality of individual flow paths 178, a second individual flow path 178b communicates with the second nozzle hole 170b.

For example, as shown in FIG. 7, the individual flow path 178 has an expanded portion 179a, a narrowed portion 179b, and a constant cross-sectional area portion 179c.

In the expanded portion 179a of the individual flow path 178, a cross-sectional area of the individual flow path 178 increases toward the nozzle hole 170. In the shown example, as a width of the individual flow path 178 in the Y-axis direction increases, a cross-sectional area of the expanded portion 179a increases. In the shown example, the "cross-sectional area" is a cross-sectional area taken along a plane parallel to an XY plane.

In the narrowed portion 179b of the individual flow path 178, the cross-sectional area of the individual flow path 178 decreases toward the nozzle hole 170. In the shown example, as a width of the individual flow path 178 in the X-axis direction decreases, a cross-sectional area of the narrowed portion 179b decreases. The narrowed portion 179b is located downstream of the expanded portion 179a.

In the constant cross-sectional area portion 179c of the individual flow path 178, the cross-sectional area of the individual flow path 178 is constant toward the nozzle hole 170. The constant cross-sectional area portion 179c is located downstream of the narrowed portion 179b. In the shown example, the constant cross-sectional area portion 179c is coupled to the nozzle hole 170.

The ejection adjustment unit 180 adjusts an ejection amount of the molding material from the nozzle hole 170. As shown in FIG. 5, the ejection adjustment unit 180 includes an insertion portion 182 that is inserted into the individual flow path 178, and a support portion 184 that supports the insertion portion 182.

The insertion portion 182 of the ejection adjustment unit 180 has, for example, a rectangular shape when viewed from the X-axis direction. When the insertion portion 182 has the rectangular shape, processing of the insertion portion 182 is easier than, for example, when the insertion portion has a circular shape.

The support portion 184 of the ejection adjustment unit 180 is coupled to a drive unit (not shown). The ejection adjustment unit 180 is moved in the X-axis direction by driving of the drive unit. Accordingly, the insertion portion 182 can be inserted into the individual flow path 178, or the insertion portion 182 can be pulled out from the individual flow path 178. In the shown example, the insertion portion 182 is inserted into a coupling portion of the individual flow path 178 to the common flow path 173. The drive unit includes, for example, a compressor, a solenoid, and a motor. The drive unit is controlled by the control unit 40.

The plurality of ejection adjustment units 180 are provided corresponding to the plurality of nozzle holes 170. A first ejection adjustment unit 180a among the plurality of ejection adjustment units 180 adjusts an ejection amount of the molding material from the first nozzle hole 170a. A second ejection adjustment unit 180b among the plurality of ejection adjustment units 180 adjusts an ejection amount of the molding material from the second nozzle hole 170b. Two ejection adjustment units 180 to be inserted into adjacent individual flow paths 178 among the plurality of individual flow paths 178 are inserted while being moved in mutually opposite directions in the X-axis direction. In the shown example, the first ejection adjustment unit 180a is inserted into the first individual flow path 178a while being moved in a −X-axis direction. The second ejection adjustment unit 180b is inserted into the second individual flow path 178b while being moved in the +X-axis direction. The ejection adjustment units 180 do not need to be provided corresponding to the plurality of nozzle holes 170, respectively, and the ejection adjustment unit 180 may be provided for at least one nozzle hole 170 among the plurality of nozzle holes 170.

As shown in FIG. 7, the heating units 186 are provided in the base portion 162. The heating unit 186 is, for example, a bar heater. In the shown example, the heating unit 186 is inserted into the base portion 162 in the Y-axis direction. The heating unit 186 penetrates the base portion 162, for example. The heating unit 186 heats the individual flow path 178 by heating the base portion 162. The heating unit 186 heats pressing units 190, 192 via screws 194. The heating unit 186 is controlled by the control unit 40.

For example, the plurality of heating units 186 are provided. In the example shown in FIG. 4, four heating units 186 are provided. The tip end portion 160 includes a first heating unit 186a and a second heating unit 186b as the heating unit 186. In the shown example, the first heating unit 186a and the second heating unit 186b are arranged in the Z-axis direction. The second heating unit 186b is closer to the nozzle hole 170 than is the first heating unit 186a. As shown in FIG. 6, the ejection adjustment unit 180 is provided between the first heating unit 186a and the second heating unit 186b when viewed in the X-axis direction. No ejection adjustment unit 180 is provided between the second heating unit 186b and the nozzle hole 170 when viewed from the X-axis direction. The heating unit 186 does not need to be provided with a heater common to the individual flow paths 178, and may be provided with heaters corresponding to the individual flow paths 178.

As shown in FIG. 4, the temperature sensors 188 are provided in the base portion 162. In the shown example, two temperature sensors 188 are provided. The temperature sensor 188 is, for example, a thermocouple. The temperature sensor 188 detects a temperature of the flow path 172. The control unit 40 controls the heating unit 186 based on a value detected by the temperature sensor 188.

1.3. Pressing Unit

As shown in FIGS. 4 and 5, the three-dimensional molding device 100 further includes the first pressing unit 190 and the second pressing unit 192.

The first pressing unit 190 and the second pressing unit 192 are attached to the tip end portion 160. In the shown example, the pressing units 190, 192 are attached to an end of the tip end portion 160 in the −Z-axis direction. The pressing units 190, 192 are attached to the tip end portion 160 by, for example, the screws 194. The heating unit 186 heats the pressing units 190, 192 via the screws 194. In the shown example, the screws 194 are provided in the pressing units 190, 192 in the Y-axis direction.

The first pressing unit 190 and the second pressing unit 192 are, for example, rollers. As shown in FIG. 5, the nozzle hole 170 is formed between the first pressing unit 190 and the second pressing unit 192 when viewed in the Z-axis direction. The first pressing unit 190 and the second pressing unit 192 are arranged in the X-axis direction. In the shown example, the first pressing unit 190 is located in the −X-axis direction with respect to the second pressing unit 192.

The first pressing unit 190 and the second pressing unit 192 are disposed on a rear side in a movement direction of the ejection unit 10 relative to the stage 20, and press the material deposited on the stage 20. In the shown example, when the ejection unit 10 moves in the +X-axis direction relative to the stage 20, the first pressing unit 190 is disposed on a rear side in a movement direction and presses the material deposited on the stage 20. When the ejection unit 10 moves in the −X-axis direction relative to the stage 20, the second pressing unit 192 is disposed on a rear side in a movement direction and presses the material deposited on the stage 20. The pressing units 190, 192 press the material deposited on the stage 20 toward the stage 20.

The first pressing unit 190 and the second pressing unit 192 are, for example, members made of SUS coated with chromium nitride. By coating of chromium nitride, the material deposited on the stage 20 can be made less likely to adhere to surfaces of the pressing units 190, 192. When a direction in which the ejection unit 10 moves while ejecting the material is one direction, one of the pressing units 190, 192 may be disposed on a rear side in the movement direction of the ejection unit 10 relative to the stage 20.

1.4. Operation

Figure 8:
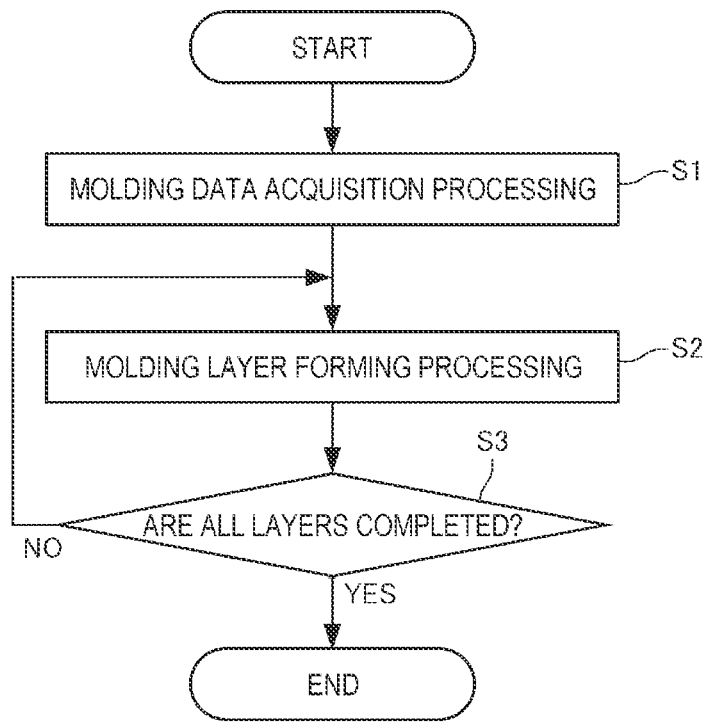
FIG. 8 is a flowchart showing processing executed by a control unit of the three-dimensional molding device according to the embodiment.

FIG. 8 is a flowchart showing processing executed by the control unit 40.

For example, a user operates an operation unit (not shown) to output, to the control unit 40, a processing start signal for starting processing. The operation unit includes, for example, a mouse, a keyboard, a touch panel, and the like. When receiving the processing start signal, the control unit 40 starts the processing.

1.4.1. Molding Data Acquisition Processing

First, as shown in FIG. 8, at step S1, the control unit 40 executes molding data acquisition processing of acquiring molding data for molding a three-dimensional molded object.

The molding data includes, for example, information on a type of the material stored in the storage unit 110, a movement path of the ejection unit 10 with respect to the stage 20, and an amount of the molding material ejected from the ejection unit 10.

For example, the molding data is created by reading shape data by slicer software installed in a computer coupled to the three-dimensional molding device 100. The shape data is data representing a target shape of a three-dimensional molded object created using three-dimensional computer aided design (CAD) software, three-dimensional computer graphics (CG) software, or the like. For example, data in a standard triangulated language (STL) format or an additive manufacturing file format (AMF) is used as the shape data. The slicer software divides the target shape of the three-dimensional molded object into layers having a predetermined thickness, and creates molding data for each layer. The molding data is represented by a G code, an M code, or the like. The control unit 40 acquires the molding data from a computer coupled to the three-dimensional molding device 100 or a recording medium such as a universal serial bus (USB) memory.

1.4.2. Molding Layer Forming Processing

Next, at step S2, the control unit 40 executes molding layer forming processing of forming a molding layer by ejecting the molding material onto the deposition surface 22 of the stage 20.

Specifically, the control unit 40 plasticizes the material supplied between the flat screw 130 and the barrel 140 to generate the molding material, and ejects the molding material from the nozzle holes 170 of the tip end portion 160. For example, the control unit 40 continuously generates the molding material until the molding layer forming processing ends.

Figure 9:
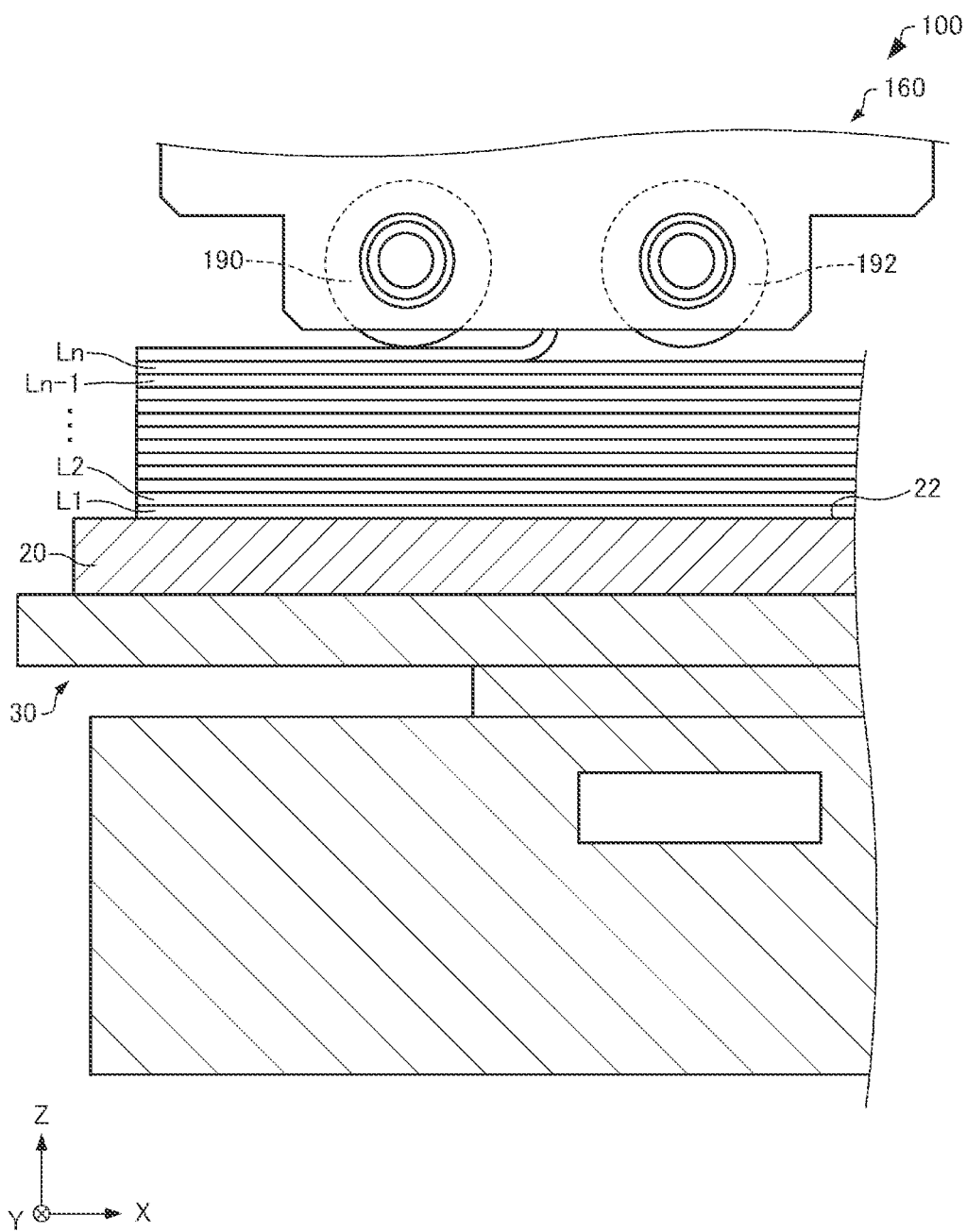
FIG. 9 is a cross-sectional view showing molding layer forming processing of the three-dimensional molding device according to the embodiment.
Figure 10:
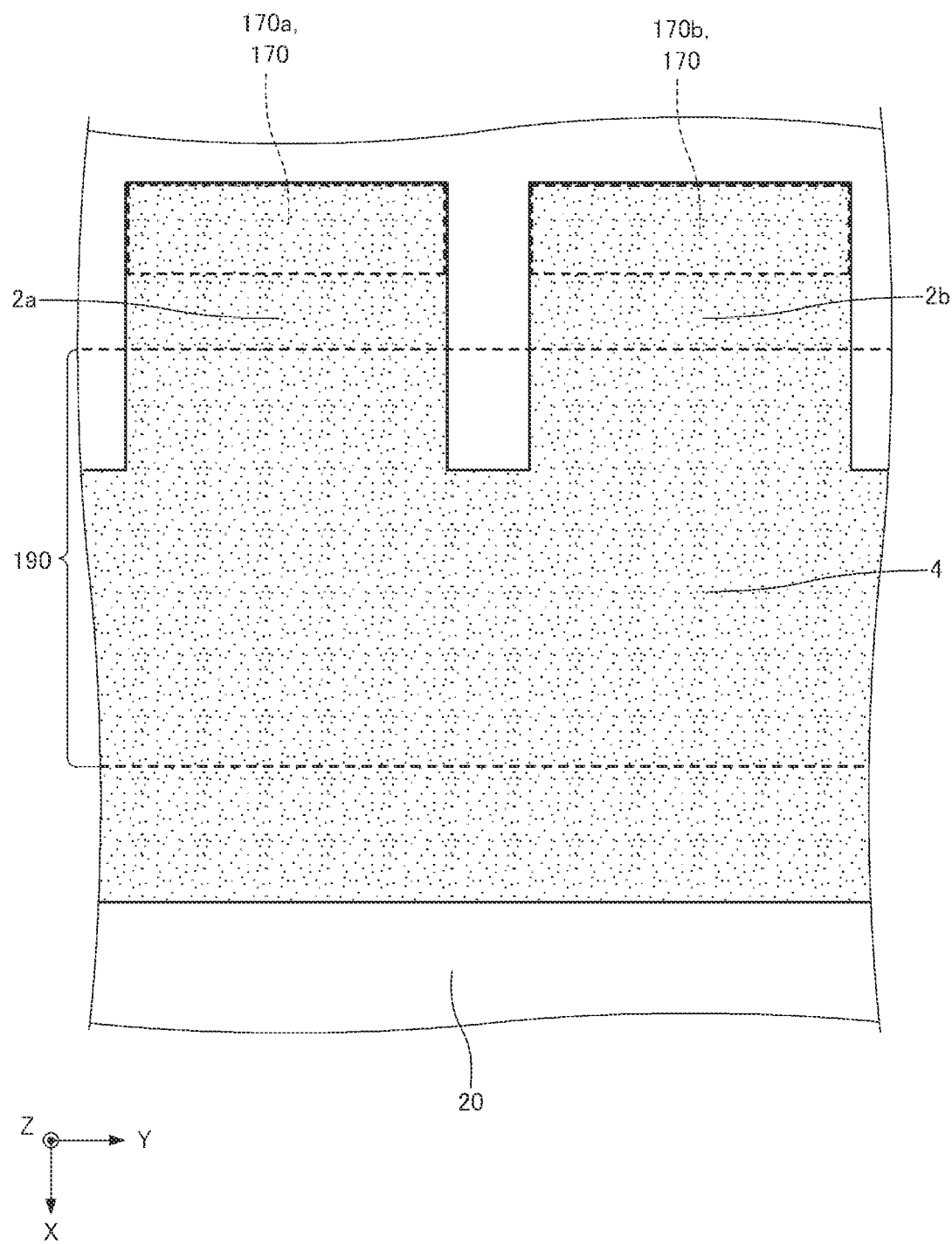
FIG. 10 is a plan view showing the molding layer forming processing of the three-dimensional molding device according to the embodiment.

Here, FIG. 9 is a cross-sectional view showing the molding layer forming processing of the three-dimensional molding device 100. FIG. 10 is a plan view showing the molding layer forming processing of the three-dimensional molding device 100.

As shown in FIG. 9, the control unit 40 controls the position changing unit 30 to change the relative positions of the ejection unit 10 and the stage 20 based on the acquired molding data, and controls the ejection unit 10 to eject the molding material from the tip end portion 160 toward the stage 20.

Specifically, before the processing of forming the molding layer is started, that is, before formation of a molding layer L1, which is a first molding layer, is started, the tip end portion 160 is disposed at an initial position in the −X-axis direction with respect to an end portion of the stage 20 in the −X-axis direction. When the processing of forming the molding layer is started, as shown in FIG. 9, the control unit 40 controls the position changing unit 30 to move the tip end portion 160 relative to the stage 20 in the +X-axis direction, for example. When the tip end portion 160 passes over the stage 20, the molding material is ejected from the tip end portion 160.

As shown in FIG. 10, when the molding material is ejected from the first nozzle hole 170a and the second nozzle hole 170b, the molding material ejected from the first nozzle hole 170a is deposited on the stage 20 to form a first deposition portion 2a. The molding material ejected from the second nozzle hole 170b is deposited on the stage 20 to form a second deposition portion 2b. The first deposition portion 2a and the second deposition portion 2b are deposited on the stage 20 at an interval in a state before coming into contact with the first pressing unit 190.

The first pressing unit 190 presses the first deposition portion 2a formed by the material that is ejected from the first nozzle hole 170a and deposited, and the second deposition portion 2b formed by the material that is ejected from the second nozzle hole 170b and deposited at an interval from the first deposition portion 2a, so as to couple the first deposition portion 2a and the second deposition portion 2b. The first deposition portion 2a and the second deposition portion 2b are pressed by the first pressing unit 190, thus a width in the X-axis direction is increased, and the first deposition portion 2a and the second deposition portion 2b are coupled to each other to form a common deposition portion 4. Then, the molding layer L1 is formed.

By repeating the above processing, a plurality of molding layers are laminated on the stage 20 as shown in FIG. 9. In FIG. 9, n is any natural number, and layers up to an nth molding layer Ln are shown.

1.4.3. Determination Processing

Next, as shown in FIG. 8, at step S3, the control unit 40 executes determination processing of determining whether formation of all the molding layers is completed based on the molding data.

When it is determined that the formation of all the molding layers is not completed ("NO" in step S3), the control unit 40 returns the processing to step S2. The control unit 40 repeats step S2 and step S3 until it is determined in step S3 that the formation of all the molding layers is completed.

On the other hand, when it is determined that the formation of all the molding layers is completed ("YES" in step S3), the control unit 40 ends the processing.

1.5. Operational Effect

The three-dimensional molding device 100 includes: the stage 20 having the deposition surface 22 on which a material is to be deposited; the ejection unit 10 including the tip end portion 160 in which the first nozzle hole 170a and the second nozzle hole 170b are formed adjacent to each other at a predetermined interval along the Y axis parallel to the deposition surface 22, and configured to eject the material from the first nozzle hole 170a and the second nozzle hole 170b toward the stage 20; the position changing unit 30 configured to change relative positions of the stage 20 and the ejection unit 10 along the X axis parallel to the deposition surface 22; and the pressing unit 190 disposed on a rear side in a movement direction of the ejection unit 10 relative to the stage 20 and configured to press the material deposited on the stage 20. The pressing unit 190 presses the first deposition portion 2a formed by the material that is ejected from the first nozzle hole 170a and deposited, and the second deposition portion 2b formed by the material that is ejected from the second nozzle hole 170b and deposited at an interval from the first deposition portion 2a, so as to couple the first deposition portion 2a and the second deposition portion 2b.

Therefore, in the three-dimensional molding device 100, a time difference from ejection to contact with the deposited material between the materials ejected from the first nozzle hole 170a and the second nozzle hole 170b adjacent to each other can be reduced as compared with a case where the first nozzle hole and the second nozzle hole are not arranged along a direction orthogonal to the movement direction of the ejection unit relative to the stage. Specifically, a time difference between a time from when the material is ejected from the first nozzle hole 170a to when the material comes into contact with the second deposition portion 2b and a time from when the material is ejected from the second nozzle hole 170b to when the material comes into contact with the first deposition portion 2a can be reduced. Accordingly, it is possible to reduce a possibility that a gap occurs between the first deposition portion 2a and the second deposition portion 2b after being pressed by the pressing unit 190.

Figure 11:
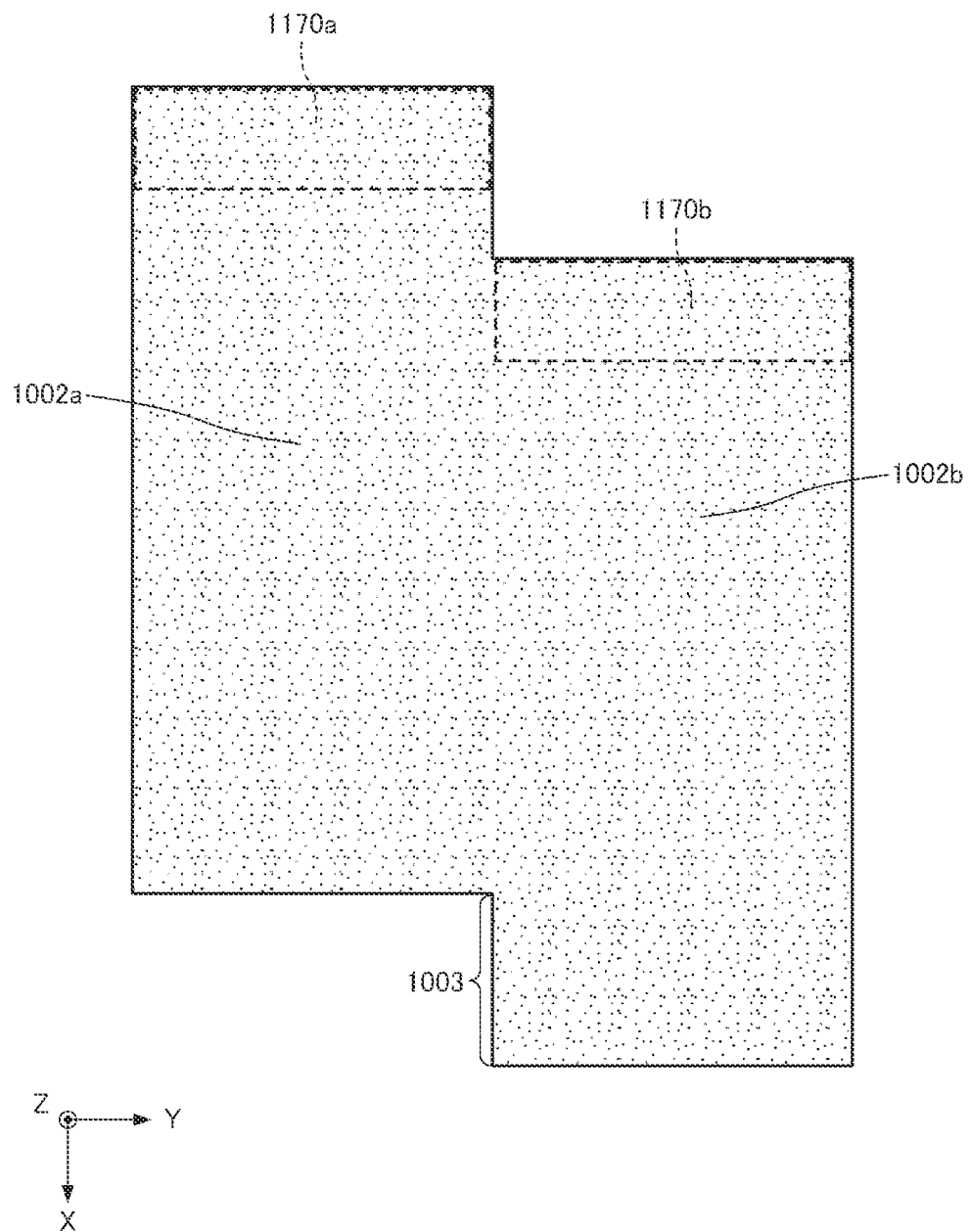
FIG. 11 is a plan view showing molding layer forming processing of a three-dimensional molding device according to a reference example.

In the three-dimensional molding device 100, for example, when a three-dimensional molded object having a rectangular parallelepiped shape is molded, a wasted material can be reduced. As shown in FIG. 11, when a first nozzle hole 1170a and a second nozzle hole 1170b are not aligned in the X-axis direction, it is necessary to cut a non-contact portion 1003 of a second deposition portion 1002b that does not come into contact with a first deposition portion 1002a in order to mold the three-dimensional molded object having the rectangular parallelepiped shape, and the material is wasted. FIG. 11 is a plan view showing molding layer forming processing of a three-dimensional molding device according to a reference example.

In the three-dimensional molding device 100, the ejection unit 10 ejects the material from a position where the tip end portion 160 and the material deposited on the stage 20 are not in contact with each other. Therefore, in the three-dimensional molding device 100, the material deposited on the stage 20 is not pressed by the nozzle hole 170, but by the pressing unit 190 moving in the Y-axis direction. Accordingly, when the deposited material contains air bubbles, the air bubbles can be cleanly removed by the pressing unit 190 moving from one direction.

In the three-dimensional molding device 100, the individual flow path 178a communicating with the first nozzle hole 170a is formed in the tip end portion 160. The individual flow path 178a has the narrowed portion 179b whose cross-sectional area decreases toward the first nozzle hole 170a. Therefore, in the three-dimensional molding device 100, a density of the material can be increased at the narrowed portion 179b. Accordingly, air bubbles mixed in the material can be reduced.

In the three-dimensional molding device 100, the tip end portion 160 includes the heating unit 186 configured to heat the individual flow path 178a. Therefore, in the three-dimensional molding device 100, adhesion between the first deposition portion 2a and the second deposition portion 2b after being pressed by the pressing unit 190 can be improved.

In the three-dimensional molding device 100, the tip end portion 160 includes, as the heating unit 186, the first heating unit 186a and the second heating unit 186b provided closer to the first nozzle hole 170a than is the first heating unit 186a, and the ejection adjustment unit 180a provided between the first heating unit 186a and the second heating unit 186b when viewed from the X-axis direction and configured to adjust an ejection amount from the first nozzle hole 170a.

Therefore, in the three-dimensional molding device 100, for example, a distance between the second heating unit 186b and the first nozzle hole 170a can be reduced as compared with a case where the ejection adjustment unit is provided between the second heating unit and the first nozzle hole as viewed from the X-axis direction. Accordingly, the first nozzle hole 170a can eject the material in a high-temperature state. For example, when the ejection adjustment unit is provided between the second heating unit and the first nozzle hole as viewed from the X-axis direction, a distance between the second heating unit and the first nozzle hole needs to be increased.

In the three-dimensional molding device 100, the heating unit 186 heats the pressing unit 190. Therefore, in the three-dimensional molding device 100, since the pressing unit 190 can be heated by the heating unit 186 that heats the individual flow path 178a, it is not necessary to separately provide a heating unit that heats the pressing unit 190. Accordingly, the number of components can be reduced. Although not shown, the heating unit that heats the pressing unit 190 may be separately provided.

2. Modification of Three-Dimensional Molding Device 2.1. First Modification

Figure 12:
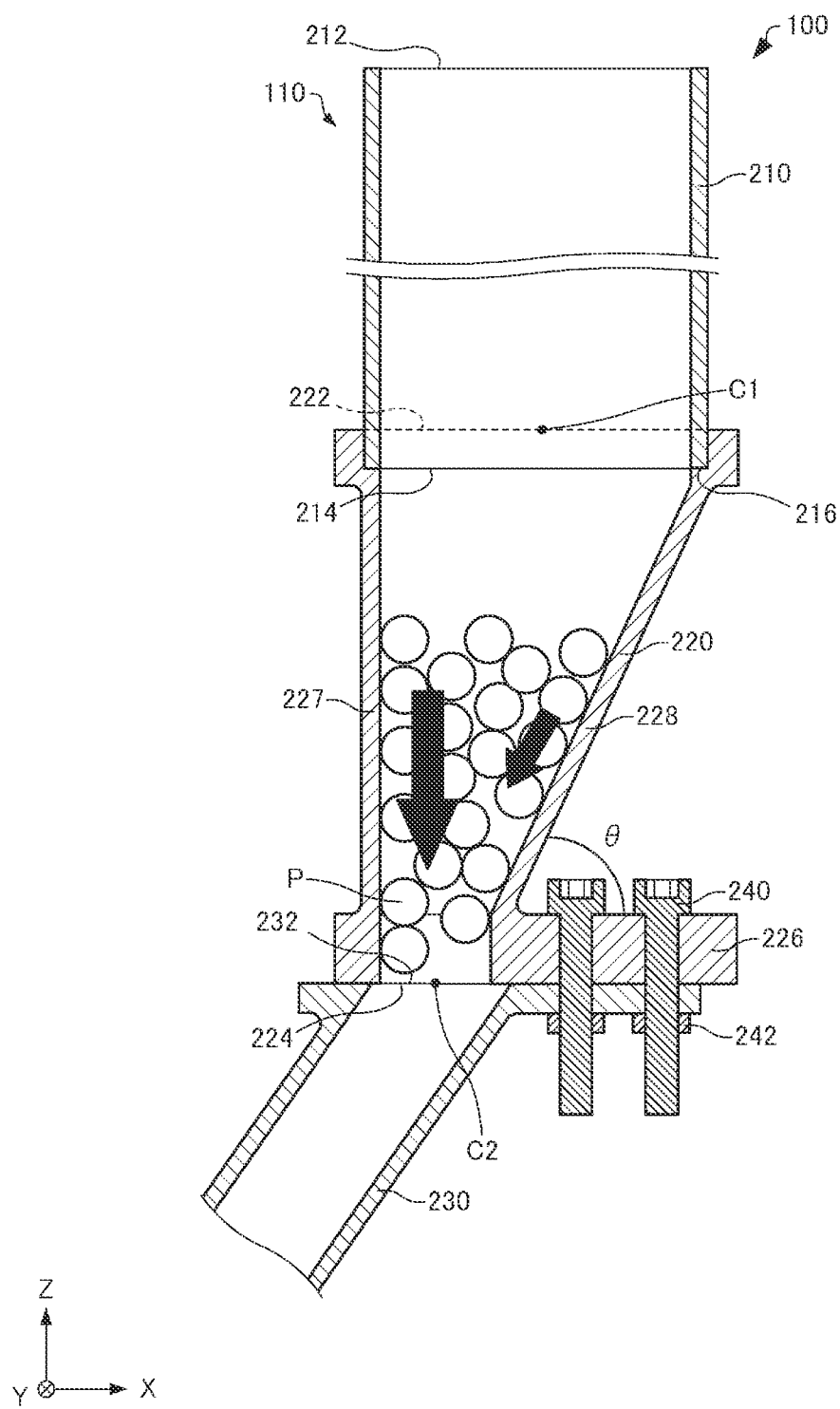
FIG. 12 is a cross-sectional view schematically showing a storage unit of a three-dimensional molding device according to a first modification of the embodiment.

Next, a three-dimensional molding device according to a first modification of the embodiment will be described with reference to the drawings. FIG. 12 is a cross-sectional view schematically showing a three-dimensional molding device 200 according to a first modification of the embodiment. Hereinafter, in the three-dimensional molding device 200 according to the first modification of the embodiment, members having the same functions as those of the constituent members of the three-dimensional molding device 100 according to the embodiment described above are denoted by the same reference numerals, and detailed description thereof will be omitted.

In the three-dimensional molding device 200, as shown in FIG. 12, the storage unit 110 has a shape different from that in the three-dimensional molding device 100 described above.

In the three-dimensional molding device 200, the storage unit 110 includes, for example, a main body portion 210, an input portion 220, and a coupling pipe 230. A material P is supplied to the plasticization unit 120 through the main body portion 210, the input portion 220, and the coupling pipe 230 in this order.

The main body portion 210 has, for example, a tubular shape. The main body portion 210 has one opening 212 and the other opening 214. The one opening 212 is located in the +Z-axis direction with respect to the other opening 214. A position of a center of the one opening 212 and a position of a center of the other opening 214 are the same when viewed from the Z-axis direction. The main body portion 210 has a bottom 216. In the shown example, the bottom 216 is an end of the main body portion 210 in the −Z-axis direction.

The input portion 220 is coupled to the bottom 216 of the main body portion 210. The input portion 220 has a first opening 222 and a second opening 224. The first opening 222 is located in the +Z-axis direction with respect to the second opening 224. In the shown example, an area of the first opening 222 is larger than an area of the bottom 216 of the main body portion 210. In a state in which the bottom 216 is inserted into the first opening 222, the main body portion 210 is fitted to the input portion 220.

The input portion 220 has an eccentric shape. A position of a center C1 of the first opening 222 is different from a position of a center C2 of the second opening 224 when viewed from above the main body portion 210. The position of the center C1 is different from the position of the center C2 when viewed from the Z-axis direction. The area of the first opening 222 is larger than an area of the second opening 224.

The input portion 220 includes, for example, a plate-shaped portion 226, a first wall portion 227, and a second wall portion 228. The second opening 224 is provided in the plate-shaped portion 226. In the shown example, the first wall portion 227 is perpendicular to an upper surface of the plate-shaped portion 226. The second wall portion 228 is inclined at an angle θ with respect to the upper surface of the plate-shaped portion 226. θ is, for example, 50° or more and less than 90°, preferably 55° or more and 85° or less, and more preferably 65° or more and 70° or less. The input portion 220 is, for example, a hopper.

The material P is supplied from the main body portion 210 to the input portion 220. The input portion 220 inputs the material P supplied from the first opening 222 into the plasticization unit 120 from the second opening 224 via the coupling pipe 230.

The coupling pipe 230 couples the input portion 220 and the plasticization unit 120. In the shown example, the coupling pipe 230 is coupled to the input portion 220 by screws 240 and bolts 242. The coupling pipe 230 has a third opening 232. The third opening 232 is an opening of the coupling pipe 230 on a side close to the input portion 220. The third opening 232 communicates with the second opening 224. An area of the second opening 224 is equal to or smaller than an area of the third opening 232. In the shown example, the coupling pipe 230 extends in a direction inclined with respect to the Z axis.

In the three-dimensional molding device 200, the position of the center C1 of the first opening 222 is different from the position of the center C2 of the second opening 224 when viewed from above the main body portion 210. Therefore, in the three-dimensional molding device 200, the material P moves toward the second opening 224 in a state in which symmetry is lost, as compared with a case where positions of a center C1001 of a first opening 1222 and a center C1002 of a second opening 1224 are the same as shown in FIG. 13 when viewed from the Z-axis direction. Therefore, a bridge is less likely to occur in the second opening 224. As shown in FIG. 13, when the positions of the center C1001 and the center C1002 are the same as viewed from the Z-axis direction, the material P moves toward the second opening 1224 while maintaining symmetry, and therefore, a bridge is likely to occur in the second opening 1224. FIG. 13 is a view showing a flow of the material P of the three-dimensional molding device according to the reference example.

In the three-dimensional molding device 200, the area of the second opening 224 is equal to or smaller than the area of the third opening 232. Therefore, in the three-dimensional molding device 200, the material passing through the second opening 224 can be more reliably guided to the third opening 232. For example, when the area of the second opening is larger than the area of the third opening, the material may remain in the second opening.

Next, experimental examples will be described.

A main body portion, an input portion, and a coupling pipe were assembled to prepare a storage unit. One type of concentric coupling pipe and two types of eccentric coupling pipes were prepared. In the "concentric type", a position of a center of a first opening of the input portion and a position of a center of a second opening of the input portion are the same as viewed from above the main body portion. In the "eccentric type", a position of a center of a first opening is different from a position of a center of a second opening when viewed from above the main body portion.

FIG. 14 is a table showing sizes and shapes of the main body portion, the input portion, and the coupling pipe used in each of the experimental examples. A "length" in the table is a size in a longitudinal direction. An "angle" in the table is an angle corresponding to θ in FIG. 12.

An outlet of the coupling pipe was closed, and the main body portion was filled with a pellet-shaped material of substantially 50 cm$^3$. Next, the outlet of the coupling pipe was opened, and it was confirmed whether a bridge occurred.

FIG. 15 is a table showing used materials and bridge evaluation results in the experimental examples. In the table, "PPS" indicates polyphenylene sulfide. In the table, "ABS" indicates acrylonitrile butadiene styrene resin. In the table, "POM" indicates polyacetal. In the table, "GF" indicates a glass fiber. In the table, indicates a diameter. In FIG. 15, "A" indicates that a bridge was not found, and "B" indicates that a bridge was found.

As shown in FIG. 15, it was found that a bridge is less likely to occur in the eccentric type than in the concentric type.

2.2. Second Modification

Next, a three-dimensional molding device according to a second modification of the embodiment will be described. Hereinafter, in the three-dimensional molding device according to the second modification of the embodiment, differences from the example of the three-dimensional molding device 100 according to the embodiment described above will be described, and description of the same points will be omitted.

In the three-dimensional molding device 100 described above, the material supplied from the storage unit 110 is the ABS resin.

On the other hand, in an injection molding device according to the second modification of the embodiment, a material supplied from the storage unit 110 is a material other than the ABS resin or a material obtained by adding another component to the ABS resin.

Examples of the material supplied from the storage unit 110 include materials having various materials such as a thermoplastic material, a metal material, and a ceramic material as main materials. Here, the "main material" means a material serving as a center forming a shape of the three-dimensional molded object, and means a material occupying 50% by mass or more in the three-dimensional molded object. The materials described above include those obtained by melting these main materials alone, and those obtained by melting a part of components contained together with the main materials into a paste state.

For example, a thermoplastic resin can be used as the thermoplastic material. Examples of the thermoplastic resin include a general-purpose engineering plastic and a super engineering plastic.

Examples of the general-purpose engineering plastic include polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate.

Examples of the super engineering plastic include polysulfone (PSU), polyethersulfone (PES), polyphenylene sulfide (PPS), polyarylate (PAR), polyimide (PI), polyamide-imide (PAI), polyetherimide (PEI), and polyether ether ketone (PEEK).

A pigment, a metal, a ceramic, and other additives such as a wax, a flame retardant, an antioxidant, and a thermal stabilizer may be mixed into the thermoplastic material.

In the plasticization unit 120, the thermoplastic material is plasticized and converted into a molten state by rotation of the flat screw 130 and heating of the heater 150. The molding material generated in this manner is deposited from the nozzle holes 170 and then cured by a decrease in temperature. It is desirable that the thermoplastic material is ejected from the nozzle holes 170 while being heated to a temperature equal to or higher than a glass transition point thereof and completely melted.

In the plasticization unit 120, for example, a metal material may be used as the main material instead of the thermoplastic material described above. In this case, it is desirable that a component that melts during generation of the molding material is mixed into a powder material obtained by powdering the metal material, and the mixture is input to the plasticization unit 120.

Examples of the metal material include a single metal such as magnesium (Mg), iron (Fe), cobalt (Co), chromium (Cr), aluminum (Al), titanium (Ti), copper (Cu), and nickel (Ni), or an alloy containing one or more of these metals, maraging steel, stainless steel, cobalt chromium molybdenum, a titanium alloy, a nickel alloy, an aluminum alloy, a cobalt alloy, and a cobalt chromium alloy.

In the plasticization unit 120, a ceramic material can be used as the main material instead of the metal material described above. Examples of the ceramic material include an oxide ceramic such as silicon dioxide, titanium dioxide, aluminum oxide, and zirconium oxide, and a non-oxide ceramic such as aluminum nitride.

A powder material of the metal material or the ceramic material supplied from the storage unit 110 may be a mixed material obtained by mixing a plurality of types of powder of a single metal, powder of an alloy, or powder of a ceramic material. The powder material of the metal material or the ceramic material may be coated with, for example, the above-described thermoplastic resin or another thermoplastic resin. In this case, in the plasticization unit 120, the thermoplastic resin may be melted to exhibit fluidity.

For example, a solvent may be added to the powder material of the metal material or the ceramic material supplied from the storage unit 110. Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetic esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate.

In addition, for example, a binder may be added to the powder material of the metal material or the ceramic material supplied from the storage unit 110. Examples of the binder include an acrylic resin, an epoxy resin, a silicone resin, a cellulose-based resin, other synthetic resins, PLA, PA, PPS, PEEK, and other thermoplastic resins.

The embodiment and modifications described above are merely examples, and the present disclosure is not limited thereto. For example, the embodiment and modifications may be combined as appropriate.

The present disclosure includes a configuration substantially the same as the configuration described in the embodiment, for example, a configuration having the same function, method, and result, or a configuration having the same purpose and effect. The present disclosure includes a configuration obtained by replacing a non-essential portion of the configuration described in the embodiment. The present disclosure includes a configuration having the same function and effect as the configuration described in the embodiment, or a configuration capable of achieving the same purpose. The present disclosure includes a configuration in which a known technique is added to the configuration described in the embodiment.

The following contents are derived from the embodiment and modifications described above.

A three-dimensional molding device according to one aspect of the present disclosure includes: a stage having a deposition surface on which a material is to be deposited; an ejection unit including a tip end portion in which a first nozzle hole and a second nozzle hole are formed adjacent to each other at a predetermined interval along a first axis parallel to the deposition surface, and configured to eject the material from the first nozzle hole and the second nozzle hole toward the stage; a position changing unit configured to change relative positions of the stage and the ejection unit along a second axis that is parallel to the deposition surface and that is orthogonal to the first axis; and a pressing unit disposed on a rear side in a movement direction of the ejection unit relative to the stage and configured to press the material deposited on the stage, and the pressing unit presses a first deposition portion formed by the material that is ejected from the first nozzle hole and deposited, and a second deposition portion formed by the material that is ejected from the second nozzle hole and deposited at an interval from the first deposition portion, so as to couple the first deposition portion and the second deposition portion.

According to the three-dimensional molding device, it is possible to reduce a possibility that a gap occurs between the first deposition portion and the second deposition portion after being pressed by the pressing unit.

In the three-dimensional molding device according to one aspect of the present disclosure, the ejection unit may eject the material from a position where the tip end portion and the material deposited on the stage are not in contact with each other.

According to the three-dimensional molding device, when the deposited material contains air bubbles, the air bubbles can be cleanly removed.

In the three-dimensional molding device according to one aspect of the present disclosure, an individual flow path communicating with the first nozzle hole may be formed in the tip end portion, and the individual flow path may have a portion whose cross-sectional area decreases toward the first nozzle hole.

According to the three-dimensional molding device, air bubbles mixed in the material can be reduced.

In the three-dimensional molding device according to one aspect of the present disclosure, the tip end portion may include a heating unit configured to heat the individual flow path.

According to the three-dimensional molding device, adhesion between the first deposition portion and the second deposition portion after being pressed by the pressing unit can be improved.

In the three-dimensional molding device according to one aspect of the present disclosure, the tip end portion may include as the heating unit, a first heating unit and a second heating unit provided closer to the first nozzle hole than is the first heating unit, and an ejection adjustment unit provided between the first heating unit and the second heating unit when viewed from the second axis direction and configured to adjust an ejection amount from the first nozzle hole.

According to the three-dimensional molding device, the first nozzle hole and the second nozzle hole can eject the material in a high-temperature state.

In the three-dimensional molding device according to one aspect of the present disclosure, the heating unit may heat the pressing unit.

According to the three-dimensional molding device, the number of components can be reduced.

In the three-dimensional molding device according to one aspect of the present disclosure, the ejection unit may include a storage unit configured to store the material, and a plasticization unit configured to plasticize the material supplied from the storage unit, the storage unit may include a main body portion, and an input portion coupled to a bottom of the main body portion and supplied with the material from the main body portion, the input portion may have a first opening and a second opening, and the material supplied from the first opening is input into the plasticization unit from the second opening, and a position of a center of the first opening may be different from a position of a center of the second opening when viewed from above the main body portion.

According to the three-dimensional molding device, a bridge is less likely to occur in the second opening.

In the three-dimensional molding device according to one aspect of the present disclosure, the storage unit may include a coupling pipe that couples the input portion and the plasticization unit, the coupling pipe may have a third opening communicating with the second opening, and an area of the second opening may be equal to or smaller than an area of the third opening.

According to the three-dimensional molding device, the material passing through the second opening can be more reliably guided to the third opening.

What is claimed is:

1. A three-dimensional molding device comprising:
   a stage having a deposition surface on which a material is to be deposited;
   an ejection unit including a tip end portion in which a first nozzle hole and a second nozzle hole are formed adjacent to each other at a predetermined interval along a first axis parallel to the deposition surface, and configured to eject the material from the first nozzle hole and the second nozzle hole toward the stage;
   a position changing unit configured to change relative positions of the stage and the ejection unit along a second axis that is parallel to the deposition surface and that is orthogonal to the first axis;
   a pressing unit disposed on a rear side in a movement direction of the ejection unit relative to the stage and attached to the tip end portion with a fastener, and configured to press the material deposited on the stage;
   a heating unit within the tip end portion, configured to heat the pressing unit through the fastener; and
   a control unit programmed to press a first deposition portion formed by the material that is ejected from the first nozzle hole and deposited, and a second deposition portion formed by the material that is ejected from the second nozzle hole and deposited at an interval from the first deposition portion to form a gap between the first deposition portion and the second deposition portion, so as to couple the first deposition portion and the second deposition portion.

2. The three-dimensional molding device according to claim 1, wherein
   the ejection unit ejects the material from a position where the tip end portion and the material deposited on the stage are not in contact with each other.

3. The three-dimensional molding device according to claim 1, wherein
   an individual flow path communicating with the first nozzle hole is formed in the tip end portion, and
   the individual flow path has a portion whose cross-sectional area decreases toward the first nozzle hole.

4. The three-dimensional molding device according to claim 3, wherein
   the tip end portion includes a heating unit configured to heat the individual flow path.

5. The three-dimensional molding device according to claim 4, wherein
   the tip end portion includes
      as the heating unit, a first heating unit and a second heating unit provided closer to the first nozzle hole than is the first heating unit, and
      an ejection adjustment unit provided between the first heating unit and the second heating unit when viewed from the second axis direction and configured to adjust an ejection amount from the first nozzle hole.

6. The three-dimensional molding device according to claim 4, wherein
   the heating unit heats the pressing unit.

7. The three-dimensional molding device according to claim 1, wherein
   the ejection unit includes
      a storage unit configured to store the material, and
      a plasticization unit configured to plasticize the material supplied from the storage unit, the storage unit includes
- a main body portion, and
- an input portion coupled to a bottom of the main body portion and supplied with the material from the main body portion, the input portion has a first opening and a second opening, and the material supplied from the first opening is input into the plasticization unit from the second opening, and a position of a center of the first opening is different from a position of a center of the second opening when viewed from above the main body portion.

8. The three-dimensional molding device according to claim 7, wherein the storage unit includes a coupling pipe that couples the input portion and the plasticization unit, the coupling pipe has a third opening communicating with the second opening, and an area of the second opening is equal to or smaller than an area of the third opening.

\* \* \* \* \*